Figure 1:
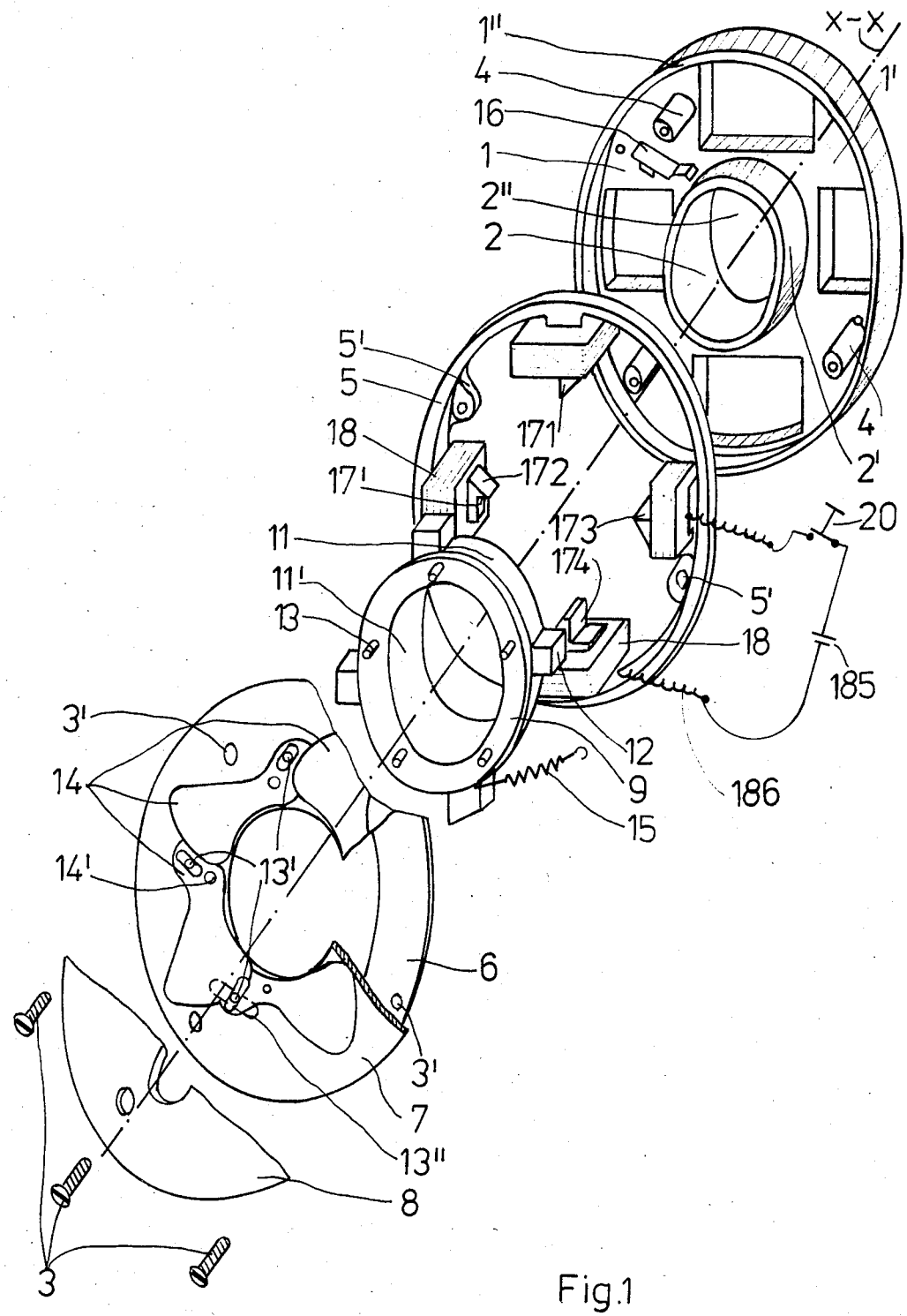

United States Patent [19]

Rietbrock et al.

[11] Patent Number: 4,561,744
[45] Date of Patent: Dec. 31, 1985

[54] ELECTROMAGNETICALLY OPERATED LEAF SHUTTER

[76] Inventors: Peter Rietbrock, 32, Otto-Grotewohl-Strasse, 6902 Jena-Lobeda, District of Gera; Gerhard Knapke, 4, Vorwerksgasse, 5300 Weimar, both of German Democratic Rep.

[21] Appl. No.: 673,061

[22] Filed: Nov. 19, 1984

[51] Int. Cl.$^4$ .............................................. G03B 9/08
[52] U.S. Cl. .................................................. 354/234.1
[58] Field of Search ........................... 354/234.1, 271.1

[56] References Cited

U.S. PATENT DOCUMENTS 4,113,359  9/1978  Koike et al. .................. 354/271.1 X
4,334,748  6/1982  Stacklies et al. ................... 354/234.1

Primary Examiner—John Gonzales

[57] ABSTRACT

The invention relates to an electromagnetically operated leaf shutter particularly for use in photographic cameras installed in microscopes in which a rotatable annular armature including a light passage is provided with an even number of poles radially extending to an annular field ring being secured into a tubular shutter housing. The annular field ring is provided with an even number of pole-shoes extending towards the armature poles. The armature and the field ring are made of "soft magnetic" material. The geometry of the pole-shoes and the adjacent respective poles is so that an optimum of magnetic force is exerted upon the armature when the electromagnetic coils which surround the pole-shoes are energized, and, hence, a rotation of the armature is effected. The armature is provided with means to operate the blades of the shutter in order to open the light passage.

4 Claims, 5 Drawing Figures

ELECTROMAGNETICALLY OPERATED LEAF SHUTTER

The invention relates to a leaf shutter for photographic cameras in which the shutter leaves or blades are rotated by an electromagnetic force against the force of a spring means into a first position in which light is passed for exposure of a photosensitive material.

The shutter further includes an armature which is rotatably seated about an optical axis and which is selected from "soft" magnetic materials.

The shutter is particularly for use in photographic cameras installed in microscope systems.

It is known to use electromagnets or permanent magnets to operate shutters or apertures.

In the DE-AS No. 2 017 467 (Prontor) a diaphragm leaf guide ring which is rotatable about an optical axis is operated by a discrete and compact pull-magnet via a lever system.

This solution involves a number of disadvantages. Since the losses due to friction and the unavoidable shocks have to be kept as low as possible a plurality of moved parts is required which render a construction bulky and complicated. The U.S. Pat. No. 2 861 506 discloses an automatic adjusting means for diaphragms, the force required is supplied by the magnetic field of a permanent magnet or, alternatively, of an electromagnet. The device is, due to the geometry of the driving and driven components, bulky and even when employing a plurality of poles not suitable for photographic shutters, in particular, when ultrafast shutter times are required.

The DE Patent Specification No. 2 738 824 discloses an electromagnetically operated shutter in which magnet coils are associated in pairs to a leaf operating ring via permanent magnets to operate the former.

The DE-Patent No. 2 853 232 discloses an electromagnetic drive system which employs a centrally arranged annular coil to better exploit the electric energy and to increase the magnetical and mechanical effectivity.

The devices mentioned hereinbefore have the following features in common which prove to be disadvantageous as will be stated hereinafter.

In order to have a favorable course of the operation function of the shutter of the blade type it is necessary to combine permanent magnets with "soft" magnetic iron elements and coils or to install considerably bulky electromagnetic coils.

Furthermore, the use of resilient members, stops and also the diameter of the moving components render the devices non-symmetrical which, in turn, necessitades stable seatings.

When these components are disposed in the vicinity of the axis of rotation, however, in different planes this involves forces transversally to the optical axis which is particularly disadvantageous and involves considerable blurrings.

It is an object of the present invention to obviate the above disadvantages.

It is a further object of the present invention to provide a simple and compact shutter for use in micro-photographic devices.

It is still a further object of the present invention to provide an electromagnetic leaf shutter which involves considerably few moving components and does without permanent magnets and which permits an economical manufacture.

It is still a further object of the present invention to provide an electromagnetic leaf shutter which, due to its geometry, ensures an optimum flux of the magnetic forces of the electromagnetic coils used from the pole-shoes to the poles of an armature.

It is still a further object of the present invention to provide means in an electromagnetic shutter which substantially eliminates magnetic stray forces upon the shutter leaves.

These and other objects are realised in an electromagnetically operated leaf shutter which comprises symmetrically to an optical axis an armature of "soft" magnetic material. The armature is of annular shape with pole "noses" extending to the exterior, said armature is secured to a leaf actuating ring similar in shape to the armature, however made of non-magnetic material. The actuating ring is provided with means for operating the shutter blades. Concentrially and radially adjacent to the armature an annular field ring is provided encompassing the former and having (from its interior face) pole-shoes extending towards the optical axis ( . . . ) in opposition to the poles. A same number of pole-shoes and of poles are provided on the annular field ring and on said armature respectively.

Preferably, the pole-shoes are radial extensions of about double the width of the poles and are surrounded each by a coil for magnetic excitation of the respective pole-shoes. A part of each pole-shoe extension projects beyond the poles almost upto the armature itself so that an abutting face is provided for a respective adjacent pole face.

The abutting faces of the pole-shoes and the abutting faces of the respective poles are in parallel to one another when substantially in contact with one another.

Preferably, means are provided to prevent "sticking" of the abutting faces to one another.

Advantageously, the pole-shoes taper towards the optical axis.

It is a further advantage when a protective ring is provided between the blades of the shutter and the armature in order to eliminate the effect of magnetic stray fields upon the shutter blades, the material of said protective ring is selected from "soft" magnetic iron.

Furthermore, means are provided to return the shutter blades to the initial position after electromagnetic actuation and exposure operation is finished.

By virtue of the inventive solution of the electromagnetic leaf shutter it is feasible to use an even number of electromagnetic coils of considerably small volume.

Said coils are connected in parallel or in series so that the magnetic polarity of adjacent pole-shoes is alternating by plus and minus. Thus, the electromagnetic coils which serve to displace the armature via the annular field ring, the pole-shoes and the poles are magnetically optimally coupled and, hence, the "soft" magnetic armature can be embodied in a technologically favorable symmetrical and closed geometry.

Furthermore, the annular field ring including the magnetic cores and pole-shoes is of a perfectly closed and symmetrical geometry for magnetic feed-back.

The "staged" embodiment of the armature poles and of the pole-shoes effects an optimized course of the curve for the magnetic forces and, hence, a very fast opening of the diaphragm shutter. Simultaneously, the longitudinal feed and the transversal thrust exerted by the respective magnetic field lines are exploited for a rotational moment upon the armature.

All components of the magnetic forces which result from the coil excitation and which do not contribute to the rotational moment of the armature are compensated due to the symmetrical magnetical connections and arrangement of the entire magnetic drive system. There are no frictional forces on the bearing of the armature which result from the magnetic forces.

It is a further advantage of the arrangment according to the invention that the magnetic flux is substantially directed in a plane which is parallel to the plane defined by the shutter blades. Residual magnetic stray fields are eliminated by the protective ring made of "soft" magnetic material as described hereinbefore.

Figure 2:
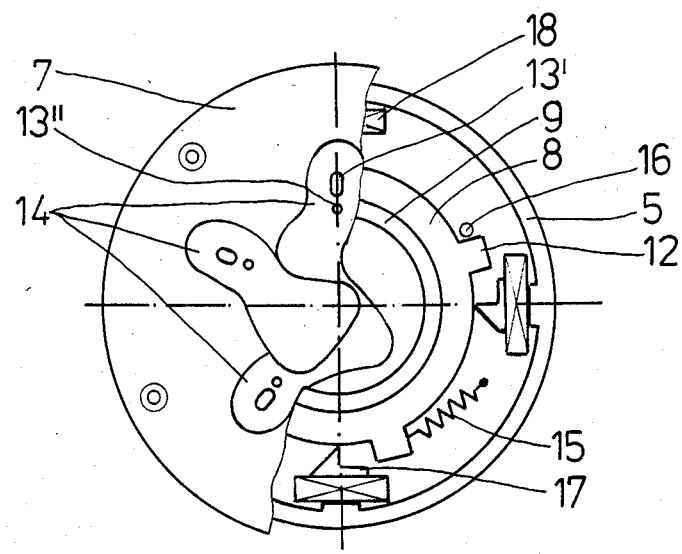
Figure 3:
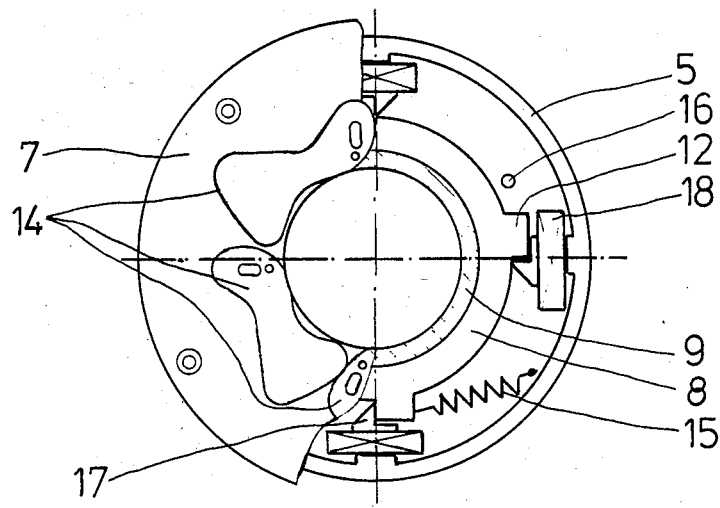
Figure 5:
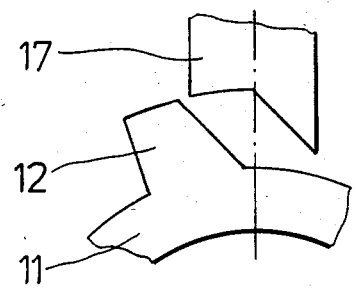
Figure 4:
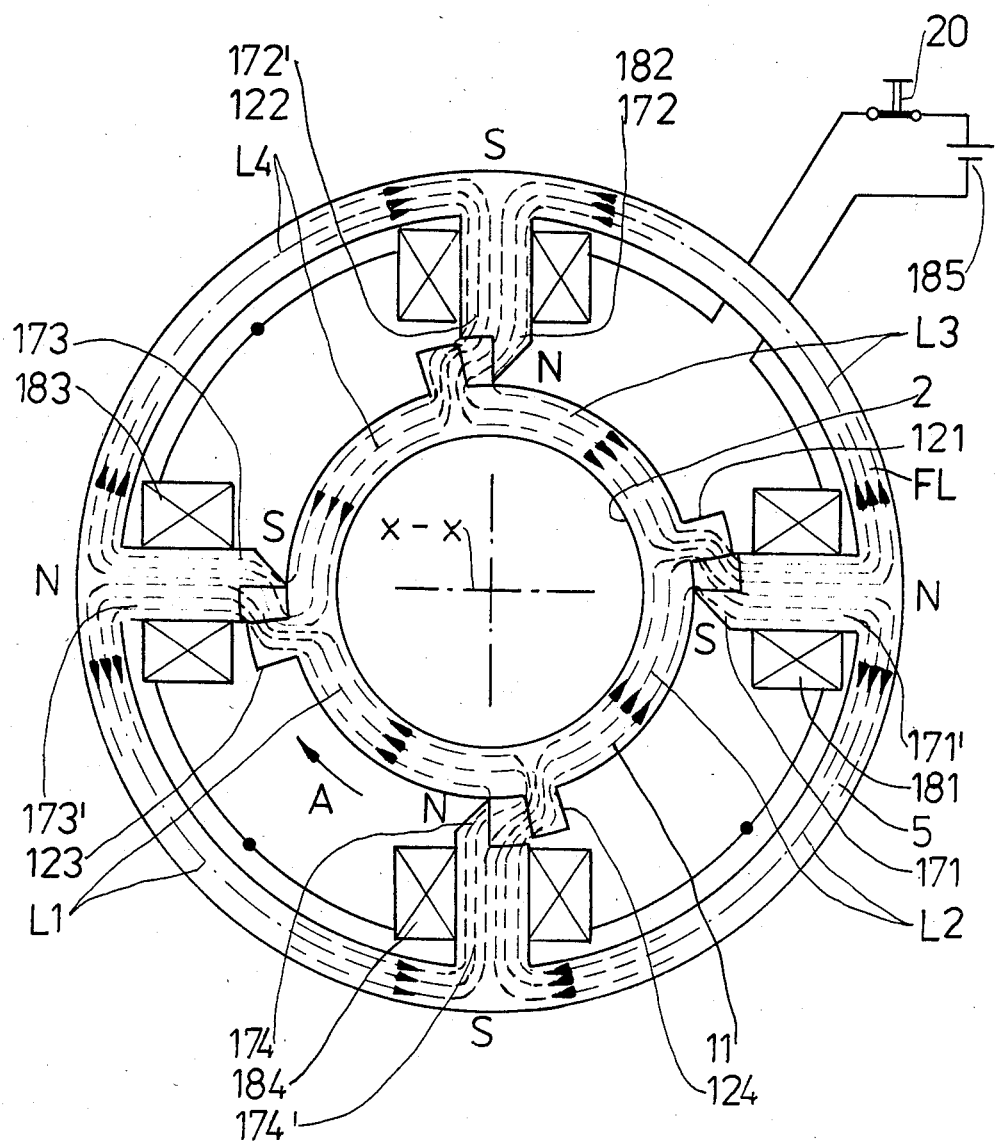

In order that the invention may be more readily understood reference is made to the accompanying drawings which illustrate diagrammatically and by way of example three embodiments thereof and where FIG. 1 is an exploded view of an electromagnetically operated shutter, FIG. 2 is a schematical front view of an electromagnetically operated shutter in the "closed" state, FIG. 3 the same as in FIG. 2 but in the "open" state, FIG. 4 a schematic view of the magnetic flux in an armature and annular field ring of an electromagnetically operated shutter, and FIG. 5 a specific embodiment of pole-shoes for an electromagnetically operated shutter.

In FIG. 1 an electromagnetically operated shutter is constituted of a tubular housing 1 which has a base or rear plate 1'. In a central portion of the latter symmetrically about an axis X—X which is also the optical axis of the shutter, a tubular shaft 2 is attached to the base plate 1'. The interior of the tubular shaft 2 leaves an opening 2" for light passage. The tubular housing wall 1" and the wall of the tubular shaft 2' are concentrically arranged relative to the axis X—X at a space which permits insertion of the components described hereinafter. Concentrically to the axis X—X an annular field ring 5 is provided adapted to fit into the housing 1 and is secured via noses 5' to the base plate 1". The screws are omitted for the sake of simplicity.

The annular field ring 5 has four projections 171, 172, 173, 174 which radially extend towards the optical axis X—X at equal spaces to one another attached to the internal face of the annular field ring 5. Each of the projections 171, 172, 173, 174 is encompassed by magnet coils or windings 181, 182, 183, and 184, respectively, which are electrically connected via lines 186 to a current source 185.

The visible portions of the projections 171, 172, 173, 174 are of the shape of an inverted one each and represent pole-shoes. An annular armature 11 is slidingly seated concentrically to the axis X—X via an internal face 11' on the tubular shaft 2.

Projecting poles 12 are disposed on the (periphery of the armature 11), the number and symmetry of which correspond to the number and symmetry of the pole-shoes 171, 172, 173, 174.

The space between the armature 11 and the annular field ring 5 permits rotation of the former within the latter. The pole-shoes 171, 172, 173, 174 are provided each with an abutting or stop face (only 17- designated) for the respective adjacently located pole 12 which face, in addition to magnetic attraction, serves to arrest the movement of the pole 12.

The annular armature 11 is composed of a first annular ring 10 (not visible), the armature 11 itself and a shutter blade actuating ring 9 which carries a plurality of pins 13 which are in parallel to the axis X—X and serve to displace the shutter blades 14.

A return spring 15 is attached via one end portion to the armature 9 and via its other end portion to the tubular housing 1, the particular place is not designated. An annular shutter blade mount 7 is coaxially fitted to the armature 9 into the tubular housing 1 at a space to the base plate 1' defined by the spacers 4.

The annular mount 7 is constituted of a magnetic protection ring 6 adjacent the armature 11 and the mount 7 itself which is, radially considered, somewhat wider than the protection ring 6. The mount 7 is provided with slots 13" (only one indicated) which permit passage of the pins 13 into slots 13' which, in turn, are provided in each of the blades 14 (only four shown).

The latter are rotatably seated via studs 14' which are secured to the annular mount 7.

Furthermore, perforations 3' are provided in the annular mount 7 and the protection ring 6 for passage of screws 3 which serve to secure the components mentioned hereinbefore into the tubular housing 1 which is closed by a cover plate 8.

The operation of the electromagnetic shutter will be explained in connection with FIG. 1, but also in referring to FIGS. 2 and 3 where like numerals designate like components.

FIGS. 2 and 3 show the shutter of FIG. 1 in front view, however, the cover plate 8 is removed.

In FIG. 2 the shutter is shown in the initial position, that is, the light passage (the shutter) is closed by the blades 14.

The poles 12 rest against stops 16 which limit the rotational path of the armature 11 in the one (counterclockwise) direction of movement.

A switch 20 is in the OFF-state and, hence, the coils 18 are not energized via the voltage source 185. Since the material for the annular field ring 5 and the pole-shoes 171, 172, 173, 174 is "soft" magnetic no magnetic forces are exerted and, hence, the poles 12 are not attracted to the pole-shoes 171, 172, 173, and 174, respectively. The return spring 15 is also in a "relaxed" position. The shutter is opened by closing the switch 20 which energizes the coils 181, 182, 183, 184 which are series-connected to the voltage source 185. Therefore, a magnetic field is built up and the armature 11 is rotated clockwise in that the poles 12, are attracted to the respective adjacent pole-shoes 171, 172, 173 and 174.

Hence, the armature 11 rotates on the tubular shaft 2 until the poles 12 abut against the contact faces (only 17' designated) of the respective poles-shoes 171, . . . 174.

The movement of the blades 14 is effected by the armature 11 via the pins 13 and the studs 14', so that the obscuring portions of the blades 14 are pivoted about the studs 14' and the light passage 2" is opened. At the same time the return spring 15 is tensioned.

The light passage 2" is opened for the time required to expose a not shown light-sensitive material.

After exposure the voltage source 185 is disconnected from the magnetic coils 18 by operation of the switch 20 so that the magnetic field collapses.

The armature 11 is rotated by the return spring 15 back and in consequence thereof the shutter blades 14 are moved into the "close" position.

The "open" state is illustrated in FIGS. 1 and 3.

In order to demonstrate the very positive effect which is inherent in the arrangement according to the invention FIG. 4 shows the magnetic flux in an iron circuit constituted of the armature 11 and of the annular field ring 5. The switch 20 connects the voltage source 185 to the magnetic coils 18 which are connected in series. A parallel connection is also feasible.

The armature 11 and the annular field ring 5 including the pole-shoes 171 . . . 174 are made of "soft" or nonretentive magnetic material which, according to Hütte, edited by Akademischen Verein Hütte E. V. Berlin, 28th edition 1955, page 289, lines 5 to 10, are such materials the hystersis loop of which approximates a curve.

Under the effect of the energized coils 181 . . . 184 magnetic north and south poles build up alternatingly at the pole-shoes 171 . . . 174 and at the not designated opposite portions of the iron cores 171' . . . 174', and the course of the field lines FL form four closed loops L1, L2, L3, L4 which are so aligned that they are always effective (only partially indicated by the dashed lines) in the same direction and not in opposition to one another, (in the pole-shoes 171 . . . 174 and in the poles 121 . . . 124) though the field lines of L1 are oriented in opposition to that of L2, L3 in opposition to L4 etc. in the annular field ring 5.

At the beginning of the rotational movement of the armature 11 relative to the annular field ring 5 a magnetic flux path (not shown) prevails between the poles 121 . . . 124 and the pole-shoes 171 . . . 174 externally of the latter similar to that between a stator and a rotor of an electromotor.

Due to the force exerted by the magnetic flux the armature 11 is attracted in a direction indicated by an arrow A. A tangential component of the magnetic force on the armature 11 decreases in the same degree as the poles 121 . . . 124 approach the tangential faces of the respective pole-shoes 171 . . . 174. At the same time the air gaps decrease between the radial faces (abutting faces 17' of FIG. 1) of the pole-shoes 171 . . . 174 and the opposing radial faces of the respective poles 121 . . . 124 so that the pole-shoes 171 . . . 174 operate as pull-magnets the forces of which increase with the decreasing air gaps between them.

Therefore, a substantially continuous course of the magnetic forces takes place for the entire shutter operation. Magnetic stray fields which nevertheless occur are reduced in their effects by the slanting faces of the pole-shoes 171 . . . 174 portions on the off-sides of the radial faces (17').

Furthermore, magnetic forces which otherwise deteriorate operation of the shutter blades due to magnetic sticking are eliminated by the screening effect of the protective ring 6 which by its "soft" magnetic properties collects the residual stray magnetic fields.

The armature 11 is seated on a socket 9 of a non-magnetizable material (such as aluminium) so that the pins 13 are not in contact with the "soft" magnetic armature 11.

The invention is not restricted to the above embodiments. It is feasible to have any other suitable shape of the pole-shoes 171 . . . 174 and a respectively adapted geometry of the "matching" poles 11, as, for example, illustrated in FIG. 5.

It is also feasible to attach the coils 181 . . . 184 to any other suitable portion of the annular field ring 5. Also the number of coils, pole-shoes and poles is optional, it is, however, a condition that each of the latter has to satisfy 2n, where n is any suitable integer. Furthermore, the switch 20 can be any suitable switching means from a manually operated switch up to a computer controlled timing circuit.

We claim:

1. An electromagnetically operated leaf shutter, particularly for use in cameras installed in microscopes comprising about an optical axis
   a tubular shutter housing having a rear face, and a housing wall, a socket, being attached to said rear face, and having a wall in spaced and concentrical relation to said tubular housing wall,
   said socket providing for a light passage in said rear face,
   an annular armature being seated for rotation via an internal face on the socket wall,
   said armature being provided with an even number of poles on an external face
   an annular field ring being secured to said housing and encompassing said armature,
   said annular field ring being provided with an even number of pole-shoes projecting towards said optical axis, said pole-shoes being each provided with a magnet coil,
   the number of pole-shoes and the number of poles being equal and satisfying the condition 2n, where n=1, 2, 3 . . . , each of said pole-shoes being associated to an adjacent one of said poles,
   said pole-shoes and said poles having each an abutting face in parallel to one another when substantially in contact,
   said pole-shoes being of wedge-shape towards said optical axis,
   means for energizing said magnet coils,
   shutter blades being operationally connected to said armature and serving for opening and closing said light passage,
   said abutting faces of said pole-shoes defining a first end position for said armature when rotated,
   means for defining a second end position for said poles of said armature when rotated,
   means for returning said armature to said second end position,
   said annular field ring being for rotating said armature into said first end-position when said magnet coils being in an energized state,
   means for protecting said shutter blades against an electromagnetic field.

2. An electromagnetically operated leaf shutter, as claimed in claim 1, wherein said armature and said annular field ring are selected from soft magnetic material.

3. An electromagnetically operated leaf shutter as claimed in claim 2, wherein said means for protecting said shutter blades is an annular ring being inserted between said shutter blades and said armature, said annular ring being of soft-magnetic material.

4. An electromagnetically operated leaf shutter as claimed in claim 3, wherein said means for energizing said magnet coils includes an electrical line from said coils to a voltage source, and switching means for connecting and disconnecting said voltage source to, respectively, from said magnet coils.

* * * * *